United States Patent
Kindig et al.

(10) Patent No.: US 6,682,714 B2
(45) Date of Patent: Jan. 27, 2004

(54) METHOD FOR THE PRODUCTION OF HYDROGEN GAS

(75) Inventors: J. Kelly Kindig, Rapid City, SD (US); Robert R. Odle, Greenville, SC (US); Thomas E. Weyand, Beaver Falls, PA (US); Boyd R. Davis, Kingston (CA)

(73) Assignee: Alchemix Corporation, Carefree, AZ (US)

( * ) Notice: Subject to any disclaimer, the term of this patent is extended or adjusted under 35 U.S.C. 154(b) by 178 days.

(21) Appl. No.: 09/800,769

(22) Filed: Mar. 6, 2001

(65) Prior Publication Data

US 2002/0127178 A1 Sep. 12, 2002

(51) Int. Cl.$^7$ .................................................. C01B 3/10
(52) U.S. Cl. ...................................... 423/657; 423/658
(58) Field of Search ................................. 423/657, 658

(56) References Cited

U.S. PATENT DOCUMENTS

| | | |
|---|---|---|
| 1,345,905 A | 7/1920 | Abbott |
| 3,031,287 A | 4/1962 | Benson et al. ............... 48/197 |
| 3,821,362 A | 6/1974 | Spacil ........................ 423/657 |
| 3,880,987 A | 4/1975 | Nahas ........................ 423/657 |
| 3,979,505 A | 9/1976 | Seitzer ...................... 423/657 |
| 4,072,514 A | 2/1978 | Suzuki ........................ 75/168 |
| 4,126,668 A | 11/1978 | Erickson ..................... 423/657 |
| 4,216,199 A | 8/1980 | Erickson ..................... 423/657 |
| 4,310,503 A | 1/1982 | Erickson ..................... 423/657 |
| 4,343,624 A | 8/1982 | Belke et al. ................... 48/61 |
| 4,555,249 A | 11/1985 | Leas ............................ 48/62 |
| 6,509,000 B1 * | 1/2003 | Choudhary et al. ......... 423/652 |

FOREIGN PATENT DOCUMENTS

| | | | |
|---|---|---|---|
| JP | 4318124 | 11/1992 | ............ C22B/1/02 |
| JP | 1992000003103 | 6/1994 | ............ C01B/3/10 |
| JP | 6-247702 | 9/1994 | ............ C01B/3/02 |

OTHER PUBLICATIONS

Straus, J., et al.: Proceedings ofthe 1995 U.S. DOE Hydrogen Program Review, Apr. 18–21, 1995, Coral Gables, Florida, vol. 2, pp. 861–876.

Hydrogen From Coal Via Tin Redox: Energy Related Invention Program #3, By D. C. Erickson, Feb. 1981.

* cited by examiner

Primary Examiner—Wayne A. Langel
(74) Attorney, Agent, or Firm—Marsh Fischmann & Breyfogle LLP

(57) ABSTRACT

A method and apparatus for the production of hydrogen gas. The method includes the reduction of steam utilizing a metal species, such as iron or tin, to form pure hydrogen gas. At least two reactors are preferably utilized to continuously form additional metal for the reduction of the steam by reducing a metal oxide. No substantial transport of the non-gaseous reactants (e.g., the metal and metal oxide) is required, thereby simplifying the apparatus and reducing the overall cost of the hydrogen production.

22 Claims, 4 Drawing Sheets

METHOD FOR THE PRODUCTION OF HYDROGEN GAS

BACKGROUND OF THE INVENTION

1. Field of the Invention

The present invention is directed to a method and apparatus for the production of high purity hydrogen gas. The method advantageously produces large volumes of hydrogen gas at a low cost as compared to prior art methods. The hydrogen gas can be used in a number of diverse applications such as for fuel cells and for many different chemical processes such as hydrogenation reactions.

2. Description of Related Art

It is known that hydrogen gas ($H_2$) can be produced from many different feedstocks such as natural gas, biomass or water using a number of different techniques such as reformation, gasification or electrolysis. The most common methods are steam methane reformation, coal gasification, non-catalytic partial oxidation, biomass gasification and pyrolysis, and electrolysis.

Steam methane reformation is believed to be the most economical and commercially viable process that is presently available. The feedstock is typically natural gas and the cost of the natural gas feedstock represents about 52% to 68% of the total cost. The process reacts methane ($CH_4$) with steam ($H_2O$) to form a gas stream that includes $H_2$ and CO and the CO must be separated from the gas stream to form pure $H_2$.

Hydrogen production from coal gasification is another established commercial technology, but is only economically competitive where natural gas prohibitively expensive. In the coal gasification process, steam and oxygen are utilized in the coal gasifier to produce a hydrogen-rich gas. High purity hydrogen can then be extracted from the synthesis gas by a water-gas shift reaction. Other gases such as fuel gases and acid gases must also be separated from the hydrogen. Hydrogen can be similarly formed by the gasification of hydrocarbons such as residual oil.

The manufacture of hydrogen by the reduction of steam using a metal species is also known. For example, U.S. Pat. No. 4,343,624 by Belke et al. discloses a 3-stage hydrogen production method and apparatus utilizing a steam oxidation process. In the first stage, a low Btu gas containing $H_2$ and CO is formed from a feedstock such as coal. The low Btu gas is then reacted in a second stage with ferric oxide ($Fe_3O_4$) to form iron (Fe), carbon dioxide ($CO_2$) and steam ($H_2O$) in accordance with the reaction:

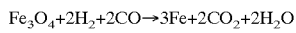

The steam and iron are then reacted in a third stage to form hydrogen gas by the reaction:

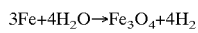

It is disclosed that the iron oxide can be returned to the second stage for use in the iron oxide reduction reaction, such as by continuously returning the iron oxide to the second stage reactor via a feed conduit. At least one of the stages takes place in a rotating fluidized bed reactor.

U.S. Pat. No. 4,555,249 by Leas discloses a gas fractionating unit that contains a reagent powder, such as an iron alloy, having a significant weight difference between the reduced form and the oxidized form. The unit includes two zones for containing the reagent powder, an oxidation zone and a reduction zone, wherein hydrogen gas is extracted from the oxidation zone. As the reagent powder is converted from the oxidized to the reduced form, the weight of the powder increases and the change in weight is utilized to transfer the reduced powder to the oxidation zone while moving the oxidized powder to the reduction zone.

The article "$H_2$ from Biosyngas via Iron Reduction and Oxidation", by Straus et al., discloses a method for hydrogen production from biosyngas. The biosyngas, which included $H_2$, CO, $H_2O$, and $CO_2$ with traces of $N_2$ and $CH_4$, was used to reduce magnetite ($Fe_3O_4$) to iron (Fe). The iron was then cooled and fed to a hydrogen gas generator where the iron was contacted with steam to form hydrogen by steam-oxidation. The iron oxide was then cooled and returned to the reduction reactor for reaction with the biosyngas.

Other metal/metal oxide systems have been used in addition to iron/iron oxide. For example, U.S. Pat. No. 3,821,362 by Spacil illustrates the use of Sn/$SnO_2$ to form hydrogen. Molten tin is atomized and contacted with steam to form $SnO_2$ and hydrogen gas. The $SnO_2$ is then contacted with a producer gas composed of $H_2$, $N_2$ and CO, which is formed by contacting powdered coal with air. The $SnO_2$ is reduced to liquid tin, which is then transferred back to the first reactor. A similar method for hydrogen production is illustrated in U.S. Pat. No. 3,979,505.

Despite the foregoing, there remains a need for a method for economically producing large volumes of hydrogen gas.

SUMMARY OF THE INVENTION

The present invention is directed to a method for the production of hydrogen gas having a high purity. According to one aspect of the present invention, the method includes the steps of separately generating a reducing gas and steam, contacting the reducing gas with a metal oxide in a first reaction zone to form a metal and contacting the steam with a metal in a second reaction zone to form hydrogen gas by reduction of the steam, yielding a metal oxide. The valve connecting the reactors and the gas generation zones is switched after a period of time such that the reducing gas is contacted with the metal oxide that was formed in the second reaction zone and steam is contacted with the metal that was formed in the first reaction zone to form hydrogen gas. The gas flows can be switched periodically to provide the continuous production of hydrogen gas.

According to one particularly preferred embodiment of the present invention, at least one of the metals is tin and at least one of the metal oxides is tin oxide. According to another preferred embodiment, at least one of the metals is iron and at least one of the metal oxides is iron oxide, preferably FeO. In one embodiment, the steam can be reacted with the metal by injecting the steam into a molten bath of the metal. In another embodiment, the steam can be contacted with solid metal particulates, such as in a fluidized bed.

The method and apparatus of the present invention advantageously enable the economical production of hydrogen gas in large volumes. It is an advantage of the present invention that the non-gaseous reactants are not physically moved during the process nor are the non-gaseous reactants substantially heated, cooled and reheated, which wastes valuable process energy.

The hydrogen production method and apparatus can stand-alone and generate large volumes of hydrogen gas for use, for example, in fuel cells or in chemical processes. Alternatively, the hydrogen production apparatus can be integrated into a chemical reduction process or the like.

DESCRIPTION OF THE INVENTION

The method according to the present invention is directed to the production of large quantities of $H_2$ gas at a relatively low cost. It is believed that one of the primary hindrances to the increased utilization of hydrogen gas in many applications such as power generation is the high cost associated with the hydrogen gas. According to the present invention, high volumes of hydrogen gas can be economically generated.

According to the present invention, a hydrogen gas stream is produced by the reduction of steam ($H_2O$) with a metal, thereby forming hydrogen gas ($H_2$) and a metal oxide (MeO). In a particularly preferred embodiment, a metal oxide is simultaneously reduced in a separate reactor to form a metal (Me) that can subsequently be used for the steam reduction.

Figure 1:
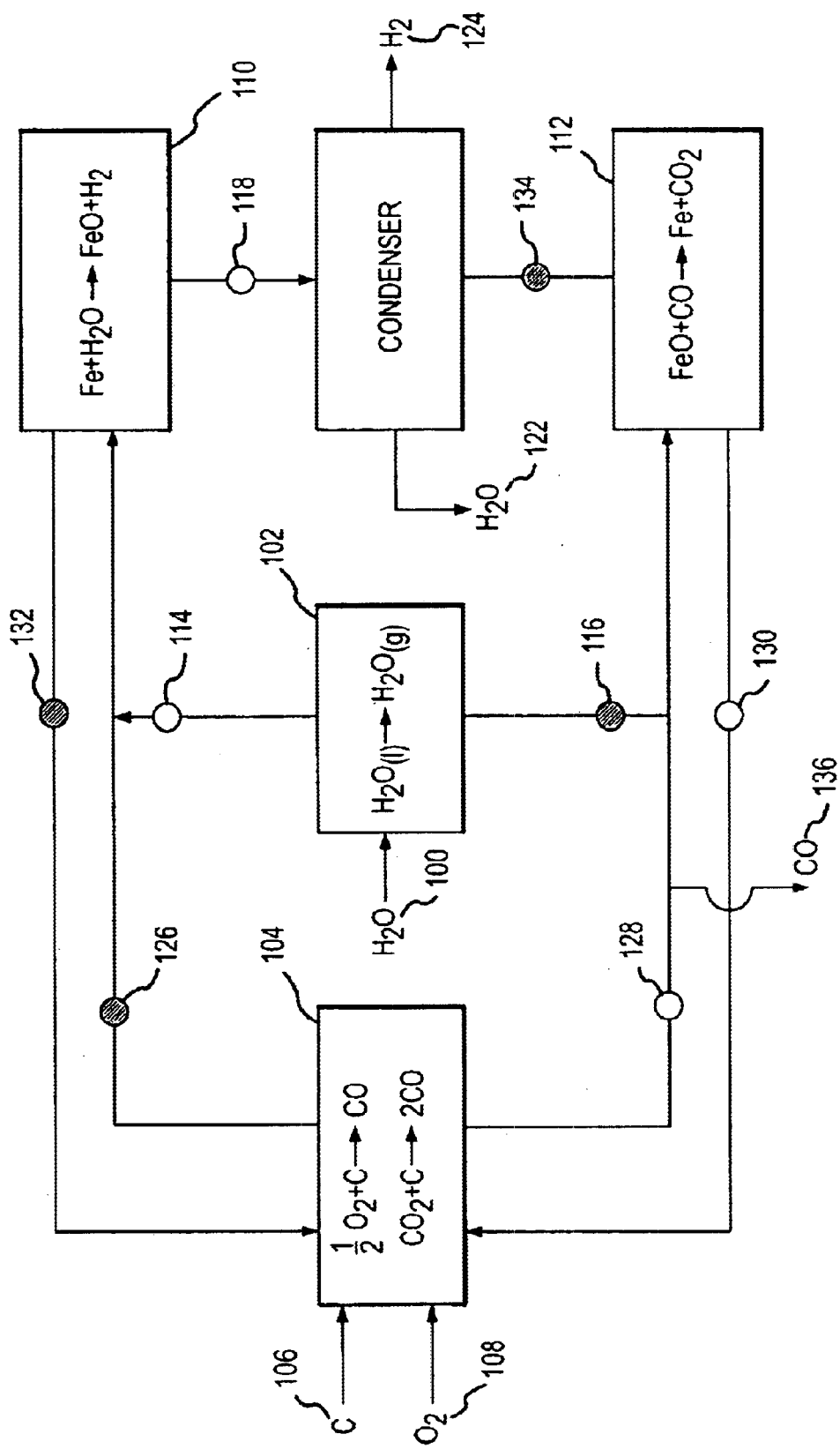
FIG. 1 illustrates a flowsheet of a method for hydrogen production using iron and iron oxide in accordance with the present invention.
Figure 2:
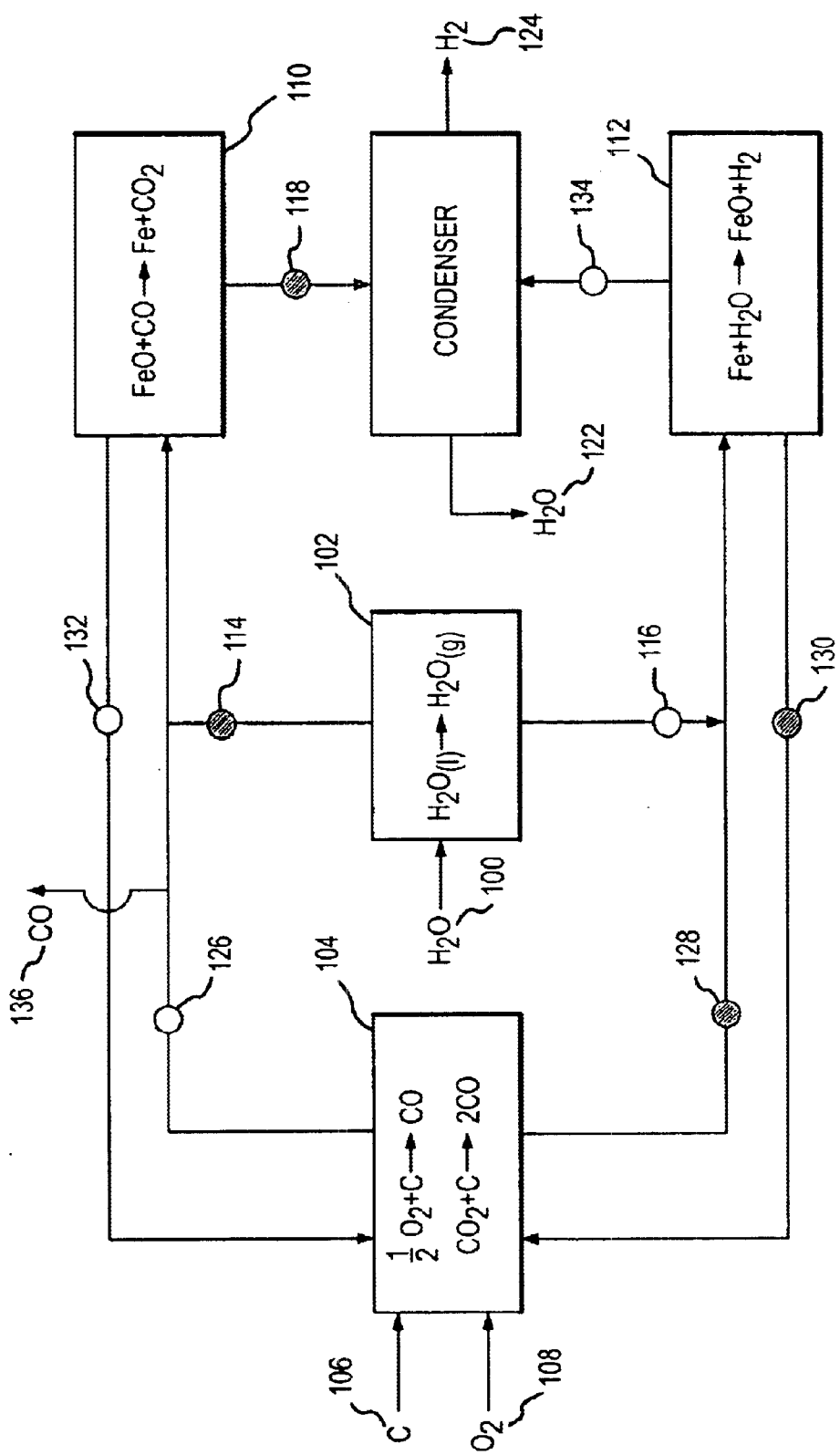
FIG. 2 illustrates a flowsheet of a method for hydrogen production using iron and iron oxide in accordance with the present invention.

Referring now to the Figures, the present invention will be described in detail. FIGS. 1 and 2 illustrate one embodiment of the method of the present invention using iron and iron oxide to generate hydrogen. FIGS. 1 and 2 illustrate the same apparatus with alternating flow of gaseous reactants and products to continuously form both iron and iron oxide reaction products for the process. Although this embodiment of the present invention is described with respect to oxidation/reduction reactions involving iron metal, it may be desirable to utilize metal alloys such as Fe/Ni or Fe/Cr.

As is illustrated in FIG. 1, steam (gaseous $H_2O$) is generated from water 100 in a reactor 102, such as a conventional boiler. The steam preferably exits the steam reactor 102 and is conveyed directly to a first reactor 110 through valve 114. The temperature of the steam can be adjusted to control the temperature in the first reactor 110.

A reducing gas, preferably a reducing gas that includes carbon monoxide (CO), is generated in a reduction gas reactor 104. In the embodiment illustrated in FIG. 1, supplying carbon 106 and oxygen 108 to the reactor 104 initially generates CO from carbon and oxygen ($O_2$). As the reaction progresses, the CO is produced from $CO_2$ by the Boudouard reaction:

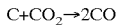

The source of the carbon 106 can be, for example, coal, oil, biomass or similar carbonaceous materials. The reducing gas exiting reactor 104 is preferably at least about 90 weight percent CO and more preferably is at least about 95 weight percent CO.

The steam and the reducing gas are then supplied to first and second reactors 110 and 112. The first and second reactors 110 and 112 can be adapted to hold molten metal or molten metal oxide through which reactant gases are passed, or the reactors can be fluidized bed reactors that are adapted to react the gases with particulate metals and metal oxides. For the use of iron and iron oxide, the first reactor 110 and second reactor 112 are preferably fluidized beds.

The steam reactor 102 has associated valves 114 and 116 that can be switched to provide the steam to either the first reactor 110 or the second reactor 112. In the embodiment illustrated in FIG. 1, the valve 114 is open to provide steam to the first reactor 110. The first reactor is initially provided with iron, preferably in particulate form. In the first reactor 110 the steam reacts with the iron to form iron oxide, preferably FeO, and hydrogen gas, in accordance with the reaction:

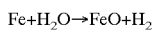

In order to maximize hydrogen production, it is preferable to feed a stoichiometric excess of $H_2O$ to the first reactor 110. Hydrogen gas and water vapor are removed through a valve 118 to a condenser 120 where water 122 is removed from the gas stream and pure hydrogen gas 124 is recovered.

Simultaneously, the reduction gas reactor 104 produces CO reducing gas. The valves 126 and 128 are controlled to provide the reducing gas composition to the appropriate reactor. In the embodiment illustrated in FIG. 1, the valve 128 is opened to supply reducing gas to the second reactor 112. Excess CO 136 is preferably removed to remove oxygen from the system corresponding to the amount of hydrogen being removed from the system. This excess CO 136 can be used as process heat, such as to heat the boiler 102, advantageously conserving heat value in the process and maximizing the use of unreacted CO.

In the second reactor 112, iron oxide is initially provided and the reducing gas composition is reacted with the iron oxide to form iron and carbon dioxide, in accordance with the reaction:

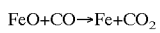

The iron oxide is preferably in fluidized particulate form to enable the rapid and economical formation of the iron. Advantageously, the carbon dioxide can be recycled back to the reactor 104 through valve 130 for the production of additional reducing gas. In one embodiment, sufficient $CO_2$ is recycled back to the reactor 104 such that the amount of fresh oxygen 108 supplied to reducing gas reactor 104 is only enough to maintain the desired reaction temperature. Preferably, the reaction temperature in the reduction gas reactor 104 is from about 800° C. to about 1300° C.

FIG. 2 illustrates the identical apparatus as is illustrated in FIG. 1. However, in FIG. 2, the valves 114, 116, 118, 126, 128, 130, 132 and 134 are switched so that the first reactor 110 is the metal oxide reduction reactor and the second reactor 112 is the steam reduction reactor. Hydrogen gas is therefore extracted from the second reactor 112 through valve 134.

In accordance with the foregoing, it is apparent that the first and second reactors 110 and 112, at any given point in time during the process, will include some mixture of iron and iron oxide. In one embodiment, the composition of the reactor feed in the first and second reactors is monitored and the flow of gaseous reactants is switched accordingly. Although temperature adjustments to the reactors can be made on a real-time basis, it is an advantage of the present invention that the reactors are maintained at a substantially constant reaction temperature regardless of whether the reactor is being utilized for the reduction of steam or the reduction of iron oxide. Therefore, no heating, cooling and reheating of the non-gaseous reactants is necessary. In a preferred embodiment, the reaction temperature of the first and second reactors is maintained at not greater than about 1000° C., such as from about 700° C. to about 900° C.

It is also an advantage of the present invention that the non-gaseous reactants (i.e., the iron and the iron oxide) are not physically moved from one location to another, such as from one reactor or reactor zone to another. On a commercially useful scale, the amount of iron and/or iron oxide in each reactor can be several hundred tons. Eliminating the need to move such a large mass of material substantially reduces the cost associated with producing the hydrogen gas. It will be appreciated that it may be desirable to supplement the iron and/or iron oxide with fresh feed due to any inherent system losses, although such supplementation should be minimal.

The present invention is applicable to the formation of hydrogen gas from other metal/metal oxide systems. In one particularly preferred embodiment, tin (Sn) and tin oxide ($SnO_2$) are used to form hydrogen gas.

Figure 3:
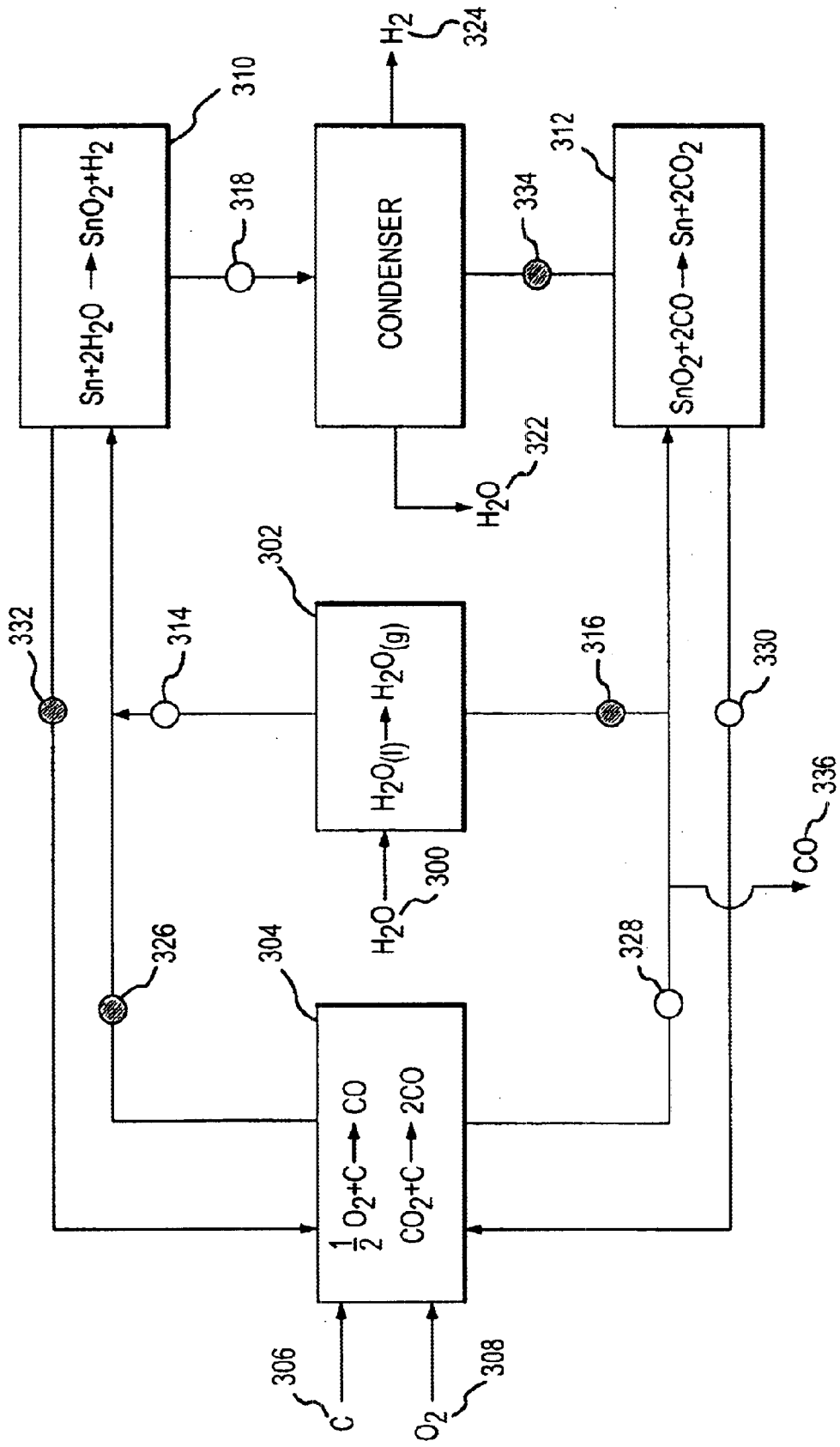
FIG. 3 illustrates a flowsheet of a method for hydrogen production using tin and tin oxide in accordance with the present invention.
Figure 4:
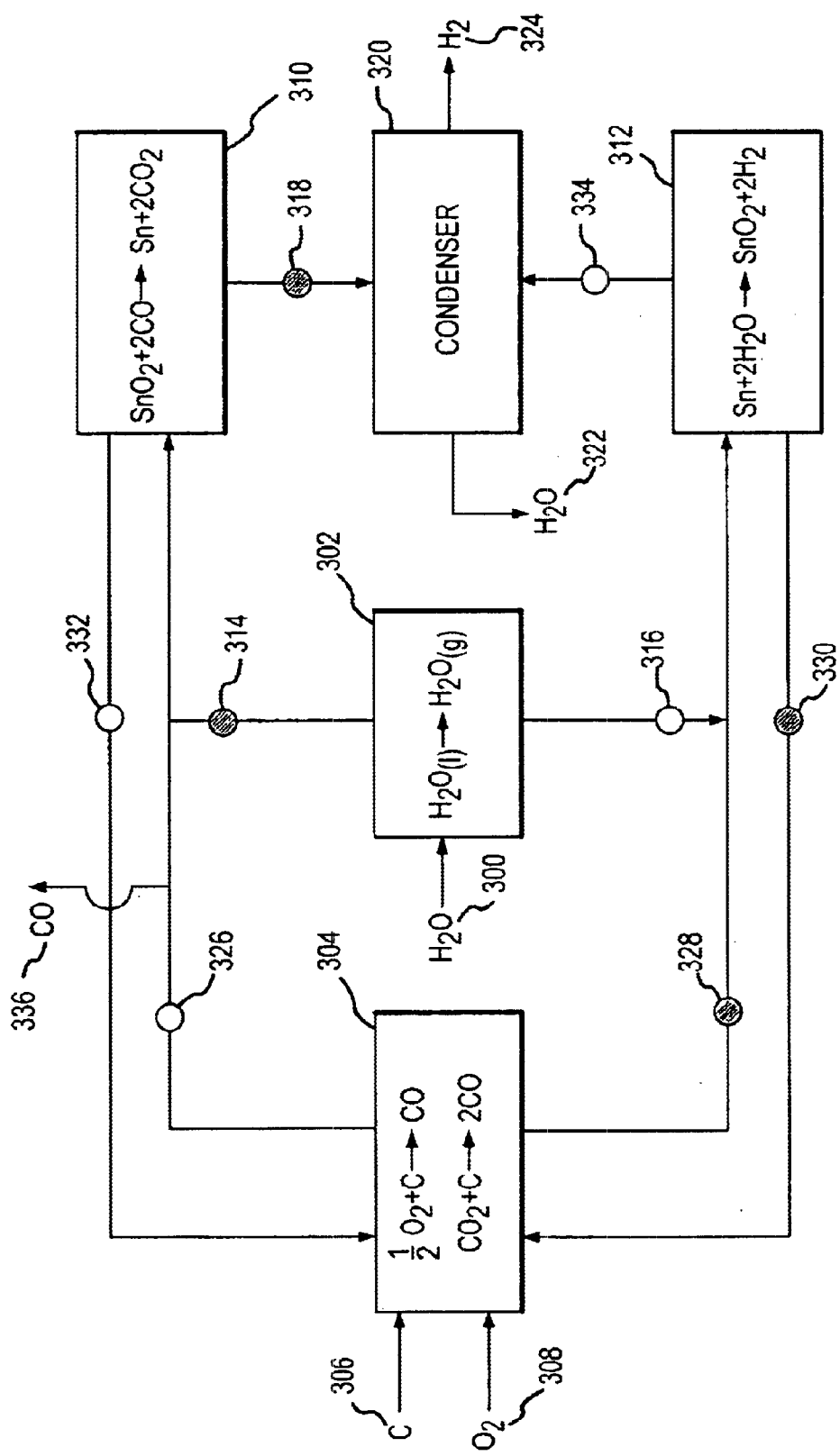
FIG. 4 illustrates a flowsheet of a method for hydrogen production using tin and tin oxide in accordance with the present invention.

FIGS. 3 and 4 illustrate an embodiment of the method of the present invention wherein hydrogen is formed using tin and tin oxide. Similar to FIGS. 1 and 2, FIGS. 3 and 4 illustrate the same apparatus with alternating flow of gaseous reactants and products to continuously form both metal and metal oxide reaction products for the process.

As is illustrated in FIG. 3, steam is generated from water 300 in a steam reactor 302, such as a conventional boiler. The steam exits the steam reactor and is conveyed to the first reactor 310 through valve 314. The temperature of the steam can be used to partially control the reaction temperature in the first reactor 310.

A reducing gas, preferably a reducing gas that includes carbon monoxide (CO), is generated in a reactor 304. In the embodiment illustrated in FIG. 3, supplying carbon 306 and oxygen 308 to the reactor initially generates CO from carbon and oxygen ($O_2$). As the reaction progresses, the CO is produced from $CO_2$ by the Boudouard reaction. The source of the carbon 306 can be, for example, coal or a similar carbonaceous material. The reducing gas exiting the reactor 304 is preferably at least about 90 weight percent CO and more preferably is at least about 95 weight percent CO.

The steam and the reducing gas are then supplied to first and second reactors 310 and 312. The steam is preferably reacted with molten tin metal by passing the gaseous steam through a pool of the molten tin metal. The molten tin metal will oxidize, forming $SnO_2$ particulates dispersed in the metal.

Therefore, the first reactor 310 and second reactor 312 are preferably large reactors adapted to heat and contain molten tin and a mixture (slurry) of molten tin with tin oxide. The steam reactor 302 has associated valves 314 and 316 that can be switched to provide the steam to either the first reactor 310 or the second reactor 312. In the embodiment illustrated in FIG. 3, the valve 314 is open to provide steam to the first reactor 310. The first reactor 310 is initially provided with a pool of molten tin having a temperature of at least about 232° C. (the melting point of tin) and preferably from about 300° C. to about 800° C. In the first reactor 310 the steam reacts with the molten tin to form tin oxide (e.g., $SnO_2$) and hydrogen gas, in accordance with the reaction:

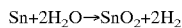

In order to maximize hydrogen production, it is preferable to feed a stoichiometric excess of $H_2O$ to the first reactor 310. Hydrogen gas and the excess water vapor are removed through a valve 318 to a condenser 320 where water 322 is removed from the gas stream and pure hydrogen gas 324 is recovered.

Simultaneously, the reduction gas reactor 304 produces CO reducing gas by the Boudouard reaction. The valves 326 and 328 are controlled to provide the reducing gas composition to the appropriate reactor. In the embodiment illustrated in FIG. 3, the valve 328 is opened to supply reducing gas to the second reactor 312. Excess CO 336 is preferably removed to remove oxygen from the system corresponding to the amount of hydrogen being removed from the system. This excess CO 336 can be used as process heat, such as to heat the boiler 302. In the second reactor 312, tin oxide is initially provided and the reducing gas composition is reacted with the tin oxide to form molten tin metal and carbon dioxide, in accordance with the reaction:

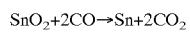

The tin oxide is preferably in particulate form to enable the rapid and economical formation of the tin and the tin oxide can initially be provided as a slurry of the oxide in molten tin metal. Advantageously, the carbon dioxide can be recycled back to the reactor 304 through valve 328 for the production of additional reducing gas. In one embodiment, sufficient $CO_2$ is recycled back to the reactor 304 such that the amount of fresh oxygen 308 supplied to Boudouard reactor 304 is only enough to maintain the desired reaction temperature, which is preferably from about 800° C. to about 1300° C.

FIG. 4 illustrates the identical apparatus as is illustrated in FIG. 3. However, in FIG. 4, the valves 314, 316, 318, 326, 328, 330, 332 and 334 are switched so that the first reactor 310 is the metal oxide reduction reactor and the second reactor 312 is the steam reduction reactor. Hydrogen gas is therefore extracted from the second reactor 312 through valve 334.

It is apparent that the reactors 310 and 312, at any given point in time during the process, will include some mixture of tin and tin oxide. In one embodiment, the composition of the reactor feed in the first and second reactors is monitored and the flow of gaseous reactants is switched accordingly. Although temperature adjustments to the reactors can be made on a real-time basis, it is an advantage of the present invention that the reactors are maintained at a substantially constant reaction temperature regardless of whether the reactor is being utilized for the reduction or the oxidation of the tin. Therefore, no heating, cooling and reheating of the non-gaseous reactants is necessary. In a preferred embodiment for the manufacture of hydrogen from $Sn/SnO_2$, the reaction temperature of the first and second reactors is maintained at a temperature of at least about 232° C. and not greater than about 1120° C. (the melting point of $SnO_2$), such as from about 400° C. to about 800° C. Lower reaction temperatures are preferred to minimize large $SnO_2$ particles whereas higher temperatures increase reaction kinetics.

It is also an advantage of the present invention that the non-gaseous reactants (i.e., the molten tin and the tin oxide) are not physically moved from one location to another, such as from one reactor or reactor zone to another. On a commercially useful scale, the amount of molten tin and/or tin oxide in each reactor can be several hundred tons. By eliminating the need to move such a large mass of material, the cost associated with producing the hydrogen gas is substantially reduced. It will be appreciated that it may be desirable to supplement the tin and/or tin oxide with fresh feed due to any inherent system losses, although such supplementation should be minimal.

The hydrogen gas that is produced according to the present invention has a high purity, such as greater than about 99% or more preferably greater than about 99.9% after removal of residual water in a condenser. It is an advantage of the present invention that the hydrogen gas does not require separation from another gas species such as carbon monoxide.

Further, the method and apparatus of the present invention enable the production of high volumes of pure hydrogen gas at a low cost. Hydrogen gas has a fuel value of about 51,623 Btu/lb and is useful as a component of a combustion gas. Hydrogen can also be used for hydrogenation processes and in semiconductor fabrication. Further, hydrogen is used directly as a fuel in a fuel cell, such as a proton exchange membrane fuel cell (PEMFC).

While various embodiments of the present invention have been described in detail, it is apparent that modifications and adaptations of those embodiments will occur to those skilled in the art. However, it is to be expressly understood that such modifications and adaptations are within the spirit and scope of the present invention.

What is claimed is:

1. A method for the production of hydrogen gas, comprising the steps of:
    a) generating a reducing gas;
    b) generating steam;
    c) contacting said reducing gas with a first metal oxide in a first reaction zone to reduce said first metal oxide to a first metal;
    d) contacting said steam with a second metal in a second reaction zone to oxidize said second metal to a second metal oxide and form a first hydrogen gas stream;
    e) extracting said first hydrogen gas stream from said second reaction zone;
    f) contacting said reducing gas with said second metal oxide in said second reaction zone to reduce said second metal oxide to said second metal;
    g) contacting said steam with said first metal in said first reaction zone to oxidize said first metal to said first metal oxide and form a second hydrogen gas stream; and
    h) extracting said second hydrogen gas stream from said first reaction zone,
    wherein at least one of said first and second metals is in a molten state and said steam contacting step comprises contacting said metal in a molten state with steam by infecting steam into said molten metal.

2. A method as recited in claim 1, wherein said reducing gas comprises CO.

3. A method as recited in claim 1, wherein said reducing gas consists essentially of CO.

4. A method as recited in claim 1, wherein said step of generating a reducing gas comprises reacting $CO_2$ with carbon to form CO.

5. A method as recited in claim 1, wherein $CO_2$ is generated during said steps of contacting reducing gas with said first or second metal oxide and said $CO_2$ is recycled back to said step of generating a reducing gas.

6. A method as recited in claim 1, wherein said first and second metals are the same metal.

7. A method as recited in claim 1, wherein at least one of said first and second metals is iron.

8. A method as recited in claim 1, wherein at least one of said first and second metal oxides is FeO.

9. A method as recited in claim 1, wherein at least one of said first and second metals is tin.

10. A method as recited in claim 1, wherein said steps of contacting with a reducing gas and contacting with steam occur at a temperature of from about 700° C. to about 900° C.

11. A method as recited in claim 1, wherein said method further comprises the step of monitoring the composition of at least one of said first and second reactors and switching the flow of said steam, reducing gas and hydrogen gas stream at a point in time determined by said composition.

12. A method as recited in claim 1, further comprising the step of extracting water from said hydrogen gas stream.

13. A method for the production of hydrogen gas, comprising the steps of:
    a) generating a reducing gas;
    b) generating steam;
    c) contacting said reducing gas with tin oxide in a first reaction zone to reduce said tin oxide to tin;
    d) contacting said steam with molten tin in a second reaction zone to oxidize said molten tin to tin oxide and form a first hydrogen gas stream;
    e) extracting said first hydrogen gas stream from said second reaction zone;
    f) contacting said reducing gas with tin oxide in said second reaction zone to reduce said tin oxide to tin;
    g) contacting said steam with tin in said first reaction zone to oxidize said tin to tin oxide and form a second hydrogen gas stream; and
    h) extracting said second hydrogen gas stream from said first reaction zone.

14. A method as recited in claim 13, wherein said reducing gas comprises CO.

15. A method as recited in claim 13, wherein said reducing gas consists essentially of CO.

16. A method as recited in claim 13, wherein said step of generating a reducing gas comprises reacting $CO_2$ with carbon to form CO.

17. A method as recited in claim 13, wherein $CO_2$ generated during said steps of contacting reducing gas with tin oxide is recycled back to said step of generating a reducing gas.

18. A method as recited in claim 13, wherein said tin oxide is predominately $SnO_2$.

19. A method as recited in claim 13 wherein said steps of contacting with a reducing gas and contacting with steam occur at a temperature of from about 300° C. to about 800° C.

20. A method as recited in claim 13, wherein said step of contacting with steam comprises contacting molten tin with steam by passing steam through a molten bath of tin.

21. A method as recited in claim 13, wherein said method further comprises the step of monitoring the composition of at least one of said first and second reactors and switching the flow of said steam, reducing gas and hydrogen gas stream at a point in time determined by said composition.

22. A method as recited in claim 13, further comprising the step of extracting water from said hydrogen gas stream.

* * * * *

UNITED STATES PATENT AND TRADEMARK OFFICE
CERTIFICATE OF CORRECTION

PATENT NO.     : 6,682,714 B2
DATED          : January 27, 2004
INVENTOR(S)    : Kindig et al.

It is certified that error appears in the above-identified patent and that said Letters Patent is hereby corrected as shown below:

<u>Title page, Item [54] and Column 1, line 1,</u>
Title, after the word "METHOD", insert -- AND APPARATUS --.

<u>Column 7,</u>
Line 46, delete the word "infecting", and insert therefor -- injecting --.

Signed and Sealed this

Thirteenth Day of April, 2004

JON W. DUDAS
*Acting Director of the United States Patent and Trademark Office*